United States Patent
Werny et al.

(10) Patent No.: US 10,473,194 B2
(45) Date of Patent: Nov. 12, 2019

(54) SLIDING SYSTEM FOR A WRAPAROUND TRANSMISSION

(71) Applicant: Schaeffler Technologies AG & Co. KG, Herzogenaurach (DE)

(72) Inventors: Pierre Werny, Eckwersheim (FR); Stephan Penner, Bühl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 274 days.

(21) Appl. No.: 15/554,099

(22) PCT Filed: Feb. 12, 2016

(86) PCT No.: PCT/DE2016/200090
§ 371 (c)(1),
(2) Date: Aug. 28, 2017

(87) PCT Pub. No.: WO2016/141932
PCT Pub. Date: Sep. 15, 2016

(65) Prior Publication Data
US 2018/0038458 A1    Feb. 8, 2018

(30) Foreign Application Priority Data
Mar. 10, 2015  (DE) .......................... 10 2015 204 227

(51) Int. Cl.
*F16H 7/18*     (2006.01)
*F16H 9/24*     (2006.01)
*F16H 57/00*    (2012.01)

(52) U.S. Cl.
CPC ............ *F16H 7/18* (2013.01); *F16H 9/24* (2013.01); *F16H 57/0006* (2013.01); *F16H 2007/185* (2013.01)

(58) Field of Classification Search
CPC .. F16H 7/18; F16H 2007/185; F16H 57/0006; F16H 9/24
See application file for complete search history.

(56) References Cited

U.S. PATENT DOCUMENTS 6,435,994 B1 *  8/2002  Friedmann ................ F16H 7/18
                                                474/111
9,382,982 B2 *  7/2016  Werny ...................... F16H 7/18
(Continued)

FOREIGN PATENT DOCUMENTS

CN          1238425 A    12/1999
DE       10017005 A1    10/2000
(Continued)

OTHER PUBLICATIONS

Machine Translation of WO 2007068229 (Year: 2007).*
International Search Report for PCT/DE2016/200090; 3 pgs; dated May 4, 2016 by European Patent Office.

*Primary Examiner* — Michael R Mansen
*Assistant Examiner* — Juan J Campos, Jr.
(74) *Attorney, Agent, or Firm* — Kevin L. Parks

(57) ABSTRACT

The disclosure relates to a sliding system for a wraparound transmission for reducing vibrations and undulations of a wraparound means, the sliding system comprising a wraparound means for connecting a transmission input shaft to a transmission output shaft in a torque-transmitting manner. The wraparound means has a plurality of deflecting axes and a height oriented transversely with respect to the deflecting axes. The sliding system also includes a sliding rail which comprises a sliding channel with an inner sliding face and an outer sliding face, wherein the sliding channel defines a running direction for the wraparound means, and the sliding channel being divided in the running direction into an entry (Continued)

section, a main section and an exit section. The sliding channel has a setpoint height adapted to the height of the wraparound means.

16 Claims, 2 Drawing Sheets

(56) References Cited

U.S. PATENT DOCUMENTS

| | | | | |
|---|---|---|---|---|
| 9,777,808 B2* | 10/2017 | Urbanek | ............ | F16H 7/18 |
| 2007/0190830 A1* | 8/2007 | Wodtke | ............ | F16H 7/18 |
| | | | | 439/153 |
| 2014/0235390 A1* | 8/2014 | Urbanek | ............ | F16H 7/18 |
| | | | | 474/140 |

FOREIGN PATENT DOCUMENTS

| | | |
|---|---|---|
| DE | 102013201541 A1 | 8/2013 |
| DE | 102013212582 A1 | 1/2014 |
| JP | S6182042 A | 4/1986 |
| JP | 2013257015 A | 12/2013 |
| WO | 2007068229 A1 | 6/2007 |
| WO | 2014012741 A1 | 1/2014 |

\* cited by examiner

SLIDING SYSTEM FOR A WRAPAROUND TRANSMISSION

CROSS-REFERENCE TO RELATED APPLICATIONS

This application is the U.S. National Phase of PCT Appln. No. PCT/DE2016/200090 filed Feb. 12, 2016, which claims priority to DE 10 2015 204 227.8 filed Mar. 10, 2015, the entire disclosures of which are incorporated by reference herein.

TECHNICAL FIELD

The present disclosure relates to a sliding system for a wraparound transmission for reducing vibrations and undulations of a wraparound means, and to the use of a sliding rail for a wraparound means, and to a wraparound transmission for a drive train, in particular for a motor vehicle.

BACKGROUND

Wraparound transmissions are known from the prior art, by way of which an infinitely variable change in the step-up transmission ratio (or step-down transmission ratio) is possible at least within ranges. To this end, two cone pulley pairs are provided which have in each case two cone pulleys. The cone pulleys are oriented in each case with their cone face toward one another, and can be displaced along their common rotational axis relative to one another between a position at a maximum spacing and a position at a minimum spacing. One cone pulley is usually fixed axially and the other cone pulley can be displaced axially. A pulley wedge which is variable is therefore formed between the cone pulleys of a cone pulley pair. By means of a common wraparound means, for example a transmission chain, the two cone pulley pairs are connected to one another in a torque-transmitting manner. The wraparound means has a plurality of deflecting axes, for example by means of a plurality of chain pins in the case of a transmission chain or an infinitely large number in theory of theoretical deflecting axes in the case of a belt. The wraparound means migrates radially to the outside in a cone pulley pair when its cone pulleys are guided toward one another, and the wraparound means migrates radially to the inside in a cone pulley pair when the cone pulley pairs are moved apart from one another. Said movement is as a rule carried out in each case in precisely an opposite manner at the cone pulley pairs in a wraparound transmission, with the result that the tension of the wraparound means remains (virtually) constant, while the spacing between the cone pulley pairs is fixed, and it not being necessary for a deflecting mechanism or tensioning mechanism to be provided for the wraparound means.

A transmission input shaft is fixed rotationally relative to a first cone pulley pair, and a transmission output shaft is fixed rotationally relative to a second cone pulley pair which is connected in a torque-transmitting manner by means of the wraparound means. A transmission ratio can be set depending on the selected spacing of the cone pulleys of a cone pulley pair from one another in relation to the selected spacing of the other cone pulley pair.

A wraparound transmission of this type is known, for example, from DE 100 17 005 A1. In some fields of application, the wraparound transmission is combined with a customary manual transmission with fixed transmission ratio gears, with the result that a greater transmission ratio spread is achieved with a comparatively lower number of fixed transmission ratio gears.

On account of the wraparound means leaving the pulley wedge which is formed between the cone pulleys of a cone pulley pair in a manner which is not tangential with respect to the connection, in particular on account of polygonal running which results from a (usually) finite pitch of a chain, and other dynamic effects during the entry into and the exit from the pulley wedge, and as a consequence of changes in the transmission ratio or as a consequence of rotational non-uniformities and other vibrations, the wraparound means is set in vibration about the wraparound means plane. The wraparound means plane (or vibration plane for short) is the shortest tangential connection of the effective radius which is the set of the cone pulley pairs, that is to say the spacing of the truncated pulley wedge which is formed between the cone pulleys and corresponds to the width of the wraparound means. In this way, the position of the vibration plane is variable with the change in the transmission ratio. The vibration plane is congruent as a rule with the center plane in the running direction of the respective run, that is to say the pulling run (or load run) or the empty run of the wraparound means. In order to reduce said vibrations, sliding rails are used in the prior art, which sliding rails bear against the wraparound means with as little play as possible over as long an extent as possible and thus suppress vibrations and undulations of the wraparound means. Sliding rails of this type are known, for example, from the abovementioned DE 100 17 005 A1 or in a two-piece version from WO 2014/012741 A1.

It is a problem that different temperatures occur during operation and, in particular, relative to the beginning of start up (cold starting). The sliding rail, or at least the sliding faces in the sliding channel which is formed, is/are manufactured from a material which is particularly low-friction. Plastic is suitable, in particular, for this purpose. In contrast, the wraparound means is to be designed for tensile loading and is therefore as a rule manufactured from a different material, in particular from metal. However, the materials have different coefficients of expansion, with the result that jamming can occur between the wraparound means and the sliding rail at low temperatures, whereas the play which is set up to reduce vibrations and undulations of the wraparound means becomes too great at high temperatures.

WO 2007/068229 A1 has disclosed a sliding rail, in which the sliding rail is assembled from at least two separate elements with different materials, the materials having different coefficients of expansion. Here, the elements are arranged in such a way that the overall coefficient of expansion of the sliding rail is reduced. In this way, the change in the play between the sliding faces and the wraparound means over the change in the temperature is reduced.

In order to avoid jamming at low temperatures, the sliding faces are currently set up in such a way that the play is precisely zero at a temperature of at least the sliding faces of minus 40° C. [Celsius]. This leads to a greater play in an operating situation, however, with the result that vibrations and undulations which lead to undesired noise emissions occur increasingly.

SUMMARY

Proceeding herefrom, the object of the present disclosure is to at least partially overcome the disadvantages which are known from the prior art. The features according to the disclosure are described in the claims. The features of the claims can be combined in any technically appropriate way, it also being possible for the explanations from the following description and features from the figures to be added to this which comprise supplementary refinements of the disclosure.

The disclosure relates to a sliding system for a wraparound transmission for reducing vibrations and undulations of a wraparound means, the sliding system comprising at least the following components:

a wraparound means for connecting a transmission input shaft to a transmission output shaft in a torque-transmitting manner, the wraparound means having a plurality of deflecting axes and a height transversely with respect to the deflecting axes;

a sliding rail which comprises a sliding channel with an inner sliding face and an antagonistically oriented outer sliding face, with the result that the sliding channel defines a running direction for the wraparound means, and the sliding channel being divided in the running direction into an entry section, a main section and an exit section, the sliding channel having a setpoint height, the setpoint height being adapted to the height of the wraparound means. The sliding system is distinguished, above all, by virtue of the fact that, only at room temperature, preferably only at operating temperature, of at least the sliding faces, the main section has a first section height which is equal to the setpoint height, and, at a lower temperature of at least the sliding faces, has a first section height which is lower than the setpoint height.

The sliding system which is proposed here is set up to reduce vibrations and undulations of a wraparound means, in order thus to avoid undesired noise emissions. Here, a sliding rail is adapted with its sliding channel exactly to the wraparound means, in order that the play between the sliding faces and the wraparound means is as low as possible during operation. Here, the wraparound means is preferably configured as known from the prior art. The wraparound means has a plurality of deflecting axes, in order to transmit a torque in a circulating manner which is guided by means of the two cone pulley pairs. To this end, the wraparound means has a defined height, that is to say the spacing between an outer envelope and an inner envelope of the wraparound means during a straight (that is to say, not deflected) course of the wraparound means. Said height is fixed in a manner which is dependent on the required mechanical strength for the respective wraparound transmission, as known, for example, from the prior art.

The sliding rail has an inner sliding face and an outer sliding face, the outer sliding face being set up to bear against a section of the outer envelope of the wraparound means, and the inner sliding face correspondingly being set up to bear against a corresponding section of the inner envelope of the wraparound means. If the wraparound means is therefore considered to be a ring, a surface normal of the outer sliding face points toward the interior of the ring and a surface normal of the inner sliding face points toward the outside. A sliding channel is formed between the two sliding faces, by means of which the sliding channel guides the wraparound means, or more precisely that section of the wraparound means which is situated in each case in the sliding channel, can be guided. The sliding channel therefore imparts a defined running direction to the wraparound means during operation, which running direction limits the freedom of the wraparound means to deflect about a deflecting axis. Here, the desired running direction is particularly preferably a straight line, with the result that the deflecting axes are not deflected.

It is advantageous for many applications to give the sliding channel properties which vary over its (entire) length. For this purpose, the sliding channel is divided (theoretically) into an entry section and exit section at the start and at the end, respectively, of the sliding channel, and a main section which is arranged in between. For disruption-free and low-friction running, the entry section and/or the exit section are/is preferably provided with a widened inlet portion and/or widened outlet portion, respectively, at least directly at the inlet and at the outlet, respectively. Independently of this, the main section is preferably of stiffer design than the entry section and/or the exit section, with the result that the (reaction) force on the guided section of the wraparound means is particularly great in the case of the main section. A softer design is advantageous in the entry section and/or in the exit section, in order to press the wraparound means gently in the desired running direction.

It is now proposed here to adapt the setpoint height of the sliding channel to the height of the respective wraparound means in a way which differs from the previously disseminated design guidelines. It is namely proposed here to select the first section height of the main section in such a way that the play between the envelope of the wraparound means and the respective sliding face is precisely zero only at room temperature [approximately 20° C.] or even only at operating temperature [approximately 80° C.] of the sliding faces. At a lower temperature, the sliding channel and the respective wraparound means are therefore designed so as to overlap one another. It has been determined that, contrary to the prevailing opinion, jamming does not occur on account of the elasticity of the main section. Instead, the main section is widened, increased friction occurring which in turn leads to rapid heating of the sliding faces. In this way, room temperature or operating temperature of the sliding faces or the entire sliding rail is achieved within a few minutes, preferably less than 10 minutes, with the result that the sliding faces bear against the wraparound means without play, or at least with low play, after this time.

The first section height is preferably present over the entire length of the main section. In one alternative embodiment, the first section height is the minimum spacing between the inner sliding face and the outer sliding face in the region of the main section of two antagonistic point pairs or a plurality of antagonistic point pairs. Antagonistic point pairs lie on the point of intersection of a sliding face with a straight line, the straight line being oriented transversely with respect to the running direction.

It is to be noted that the temperature which is described here is not the ambient temperature, but rather the temperature of the sliding rail, and optionally of the wraparound means, or at least of the sliding faces, or more precisely of the respective section. Furthermore, it is to be noted that (for example, conventionally) permitted manufacturing tolerances have not been taken into consideration in this illustration.

According to a further advantageous embodiment of the sliding system, the entry section has a second section height which is lower than the setpoint height, the second section height preferably being equal to the setpoint height at the operating temperature of at least the sliding faces. As an alternative or in addition, the exit section has a third section height which is lower than the setpoint height, the third section height being equal to the setpoint height preferably at the operating temperature of at least the sliding faces.

In said embodiments, the entry section and/or the exit section are/is configured with a second section height or a third section height which is lower than the height of the respective wraparound means. Here, the second section height and/or the third section height are/is therefore configured with a theoretical overlap with the wraparound means. On account of an increased elasticity of the entry section and/or the exit section in comparison with the main section, this does not lead to jamming, but rather merely to an acceptable increase in friction. This has the advantage that the wraparound means is guided as early as possible, or for as long as possible, but at the same time is pressed merely gently in the running direction.

In one embodiment, the second section height and the third section height reach the height of the wraparound means at operating temperature, with the result that the play is precisely zero under the operating condition. As a result, the friction is reduced considerably in (warm) operation, and satisfactory guidance properties are achieved at the same time.

According to a further advantageous embodiment of the sliding system, the sliding channel has at least one lateral insertion bevel for a wraparound means, with the result that, after the room temperature of at least the sliding faces is reached, the wraparound means can at least be introduced into the sliding channel, preferably by hand.

In another embodiment, the sliding rail can be pushed laterally onto the wraparound means in the direction of the deflecting axes of the wraparound means. In the case of a two-piece construction, in which one half of the sliding rail with one part of the sliding channel can be pushed laterally over the wraparound means in each case on the right and on the left, the at least one lateral insertion bevel in a respective sliding face is arranged in each case at the connecting face of one half of the sliding rail. The insertion bevel is arranged between two faces which are arranged at an angle with respect to one another, the sliding face and a side face here, for example a connecting face, and connects them by way of a chamfer and/or rounded portion.

According to a further aspect of the disclosure, a wraparound transmission for a drive train is proposed, which wraparound transmission has at least the following components:

at least one transmission input shaft with a first cone pulley pair;

at least one transmission output shaft with a second cone pulley pair;

at least one sliding system according to an embodiment in accordance with the above description, the wraparound means connecting the first cone pulley pair to the second cone pulley pair in a torque-transmitting manner, and the at least one sliding rail being set up to reduce vibrations and undulations of the at least one wraparound means.

A torque can be transmitted in a manner which can be stepped up or stepped down by way of the wraparound transmission which is proposed here, it being possible for the transmission ratio to be set in an infinitely variable manner at least within ranges. Here, the transmission ratio is set via the two cone pulley pairs as described above. Here, the wraparound means is arranged between the cone pulley pairs which can be moved in each case relative to one another, and transmits a torque from one cone pulley pair to the other cone pulley pair. Here, the wraparound means is preferably kept at a constant length. Here, the at least one sliding rail is always oriented so as to bear parallel to the wraparound means. In an operating state, that is to say a warm state, the at least one sliding rail is in considerably improved contact in comparison with previously known sliding rails, and leads to smooth running and lower noise emissions of the wraparound means.

According to a further aspect of the disclosure, a drive train is proposed which has a drive unit with an output shaft, at least one consumer and a wraparound transmission in accordance with the above description, it being possible for the output shaft to be connected to the at least one consumer with a variable transmission ratio by means of the wraparound transmission for the transmission of torque.

The drive train is set up to transmit a torque which is provided by a drive unit, for example an energy conversion machine, and is output via its output shaft, for example of an internal combustion engine or an electric motor, in a manner which is suitable for the requirements for utilization, that is to say with consideration of the required rotational speed and the required torque. The utilization is, for example, at least one drive wheel of a motor vehicle and/or an electric generator for providing electric energy. Conversely, an absorption of inertial energy which is introduced, for example, by a drive wheel and then forms a drive unit can also be transmitted by means of the wraparound transmission to an electric generator for recuperation, that is to say for electric storage of the braking energy, by way of a torque transmission train which is set up accordingly. In one preferred embodiment, furthermore, a plurality of drive units are provided which can be operated such that they are connected in series or in parallel or are decoupled from one another, and the torque of which can be made available in each case according to requirements for utilization by means of a wraparound transmission in accordance with the above description. Examples are hybrid drives comprising an electric motor and an internal combustion engine, or else multiple cylinder engines, in which individual cylinders/cylinder groups can be switched on. In order to transmit the torque in a targeted manner and/or by means of a manual transmission with different transmission ratios, the above-described wraparound transmission is particularly advantageous because a great step-free transmission spread can be achieved in a small space. Moreover, the sliding rail which is used reduces vibrations and undulations and reliably suppresses associated noise emissions over a great temperature range.

According to a further aspect of the disclosure, a motor vehicle is proposed which has at least one drive wheel which can be driven by means of a drive train in accordance with the above description.

Most motor vehicles nowadays have a front-engine drive and in part arrange the drive unit, for example an internal combustion engine or an electric motor, in front of the driver's cab and longitudinally with respect to the main driving direction. The radial installation space is particularly small precisely in the case of an arrangement of this type, and it is therefore particularly advantageous to use wraparound transmissions of small overall size. The use of a wraparound transmission is of similar design in motorized bicycles, for which considerably increased performance with a constant amount of installation space is required. At the same time, the reliability of systems of this type has to be kept constant or even increased because the acceptance for maintenance is low among the users.

This problem is exacerbated in the case of passenger motor vehicles of the small car category in accordance with European classification. The power units which are used in a passenger motor vehicle of the small car category are not substantially smaller than in the passenger motor vehicles of larger car categories. Nevertheless, the available installation space is substantially smaller in the case of small cars. The above-described drive train has a wraparound transmission which satisfies the installation space requirements and at the same time makes low-wear reduction of vibrations and undulations and thus of the noise emissions due to the sliding rail which bears tightly over broad temperature ranges.

Passenger motor vehicles are assigned to a vehicle class in accordance with, for example, the size, price, weight and performance, said definition being subject to continuous change in accordance with the requirements of the market. In the US market, vehicles of the small car and very small car category in accordance with European classification are assigned to the category of the subcompact car, and, in the British market, they correspond to the supermini category or the city car category. Examples of the very small car category are a Volkswagen up! or a Renault Twingo. Examples of the small car category are an Alfa Romeo Mito, Volkswagen Polo, Ford Fiesta or Renault Clio.

According to a further aspect of the disclosure, the use of a sliding rail for a wraparound means for reducing vibrations and undulations of a wraparound transmission is proposed, the sliding rail comprising a sliding channel with an inner sliding face and an antagonistically oriented outer sliding face, with the result that the sliding channel defines a running direction for a wraparound means, the wraparound means having, in the running direction, a plurality of deflecting axes transversely with respect to the running direction and parallel to the sliding faces, and the wraparound means having a height transversely with respect to the deflecting axes, and the sliding channel being divided in the running direction into an entry section, a main section and an exit section, the sliding channel having a setpoint height which is adapted to the height of the wraparound means. The use is distinguished, above all, by the fact that, only at room temperature, preferably only at operating temperature, of at least the sliding faces, the main section has a first section height which is equal to the setpoint height, and, at a lower temperature of at least the sliding faces, has a first section height which is lower than the setpoint height.

The sliding rail is set up as described above and, by way of bearing tightly against a wraparound means, reduces the vibrations and undulations which lead to noise emissions. It is to be noted at this point that the sliding rail is advantageously additionally set up according to a further embodiment in accordance with the above description. To this extent, reference is made to the above description.

BRIEF DESCRIPTION OF THE DRAWINGS

The above-described disclosure will be described in detail in the following text against the relevant technical background, with reference to the associated drawings which show various embodiments. The disclosure is not restricted in any way by the purely diagrammatic drawings; it is to be noted that the drawings are not to scale and are not suitable for the definition of proportions. In the drawings.

DETAILED DESCRIPTION

Figure 1:
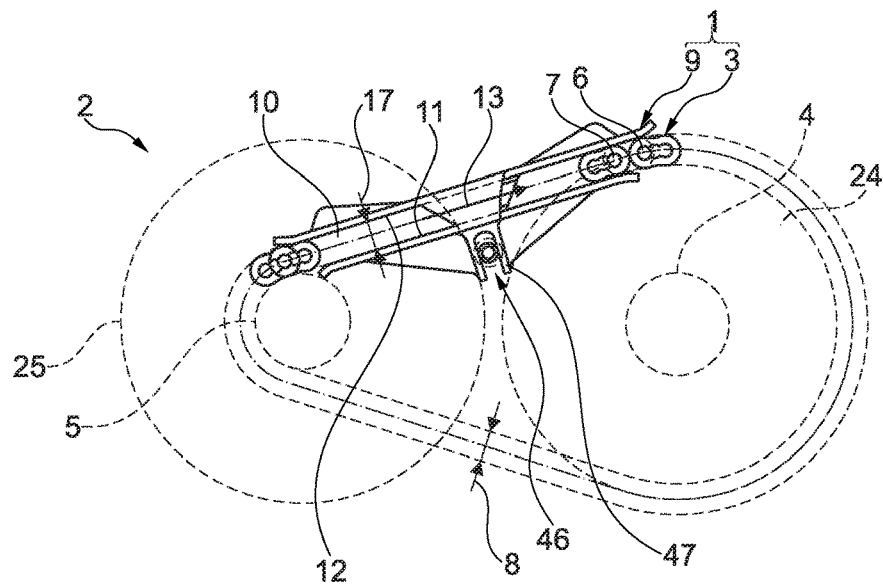
FIG. 1 shows a wraparound transmission with a sliding system.

FIG. 1 shows a wraparound transmission 2 with a sliding system 1 which comprises a sliding rail 9 and a wraparound means 3. The wraparound means 3 has a plurality of deflecting axes, of which a first deflecting axis 6 and a second deflecting axis 7 are shown here by way of example. The wraparound means 3 has a height 8 and connects a first cone pulley pair 24 and a second cone pulley pair 25 in a torque-transmitting manner, with the result that a torque can be transmitted from a transmission input shaft 4 to a transmission output shaft 5, in a manner which steps up the rotational speed in this exemplary illustration. Here, the wraparound means 3 leaves the second cone pulley pair 25 tangentially with respect to the connection, undulations and vibrations being induced in the wraparound means 3 on account of usually high rotational speeds. In order to suppress said undulations and vibrations, the sliding rail 9 is provided which forms a sliding channel 10 for the wraparound means 3 by way of an inner sliding face 11 and an outer sliding face 12. Here, the sliding channel 10 has a setpoint height 17 which is adapted to the height 8. Therefore, the inner sliding face 11 and the outer sliding face 12 bear against said section of the wraparound means 3 and impart the running direction 13 to it, the running direction 13 being a straight line here. A sliding rail bearing 46 is provided for adaptation to the respective transmission ratio between the two cone pulley pairs 24 and 25, on which sliding rail bearing 46 the sliding rail 9 is mounted movably by means of its bearing seat 47, with the result that the position of the sliding channel 10 can be adapted (automatically) to the respective transmission ratio.

Figure 2:
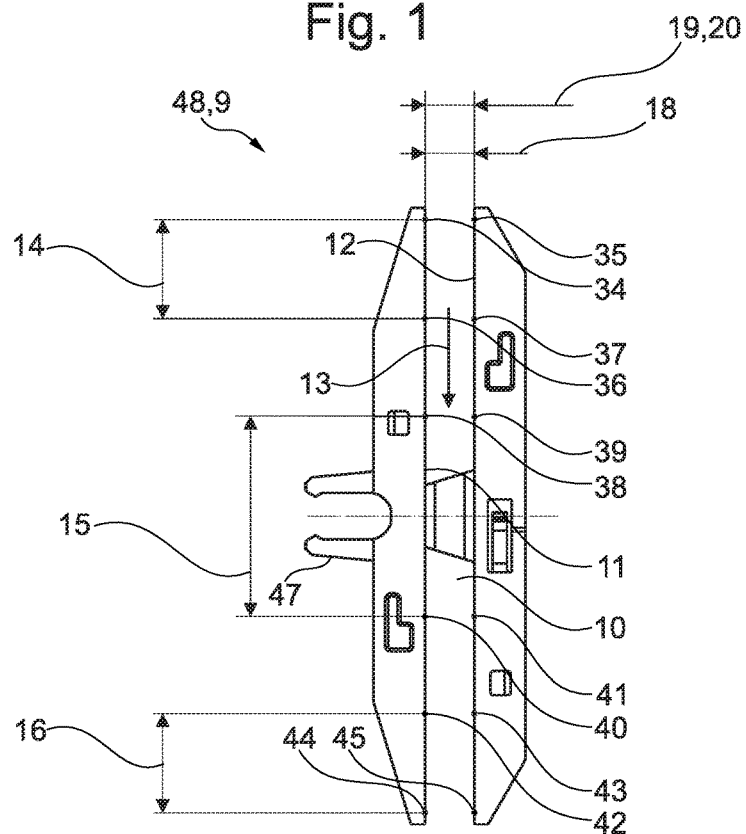
FIG. 2 shows a sliding rail half in a lateral plan view.

FIG. 2 shows a possible configuration of a sliding rail 9 in a lateral plan view, which sliding rail 9 is shown here as a sliding rail half 48 which therefore forms a closed sliding channel 10 only together with a further sliding rail half (not shown here) which is structurally identical, for example. Here, the sliding rail 9 is divided into an entry section 14, a main section 15 and an exit section 16. Said sections determine the running direction 13 for a wraparound means 3 (cf. FIG. 1), which running direction 13 can be oriented (automatically) by means of the bearing seat 47 to the respectively required direction which is tangential with respect to the connection between the two cone pulley pairs 24 and 25 (cf. FIG. 1). Here, a first section height 18 is then defined in the main section 15, in each case between the points which are shown here, the first inner main point 38 and the first outer main point 39, and the second inner main point 40 and the second outer main point 41. In this example, the second section height 19 is accordingly defined in the entry section 14, between the first inner entry point 34 and the first outer entry point 35, and the second inner entry point 36 and the second outer entry point 37. Finally, in this example, the third section height 20 is defined in the exit section 16, between the first inner exit point 42 and the first outer exit point 43, and the second inner exit point 44 and the second outer exit point 45.

Figure 3:
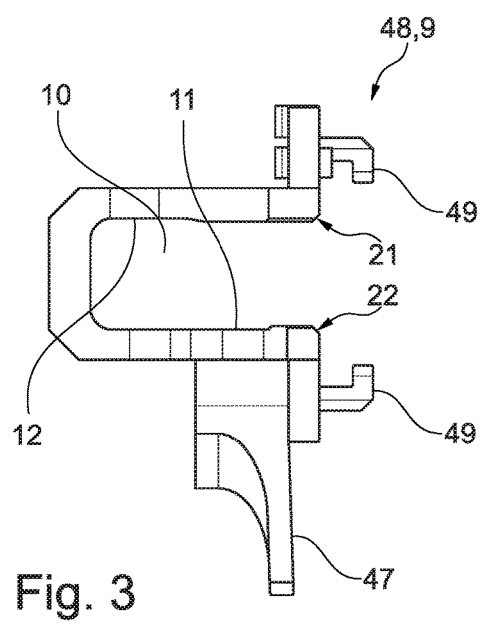
FIG. 3 shows a sliding rail half in a view in the running direction.

FIG. 3 shows a sliding rail 9, once again as a sliding rail half 48, an illustration in the running direction 13 being selected here (cf. FIG. 1 or FIG. 2). The sliding channel 10, of which only one half is shown here, has a first lateral insertion bevel 21 and a second lateral insertion bevel 22. Therefore, a wraparound means 3 (cf. FIG. 1) can be easily introduced laterally, or the sliding rail half 48 can be easily guided laterally over a wraparound means 3. A corresponding second sliding rail half (not shown here) which is, for example, structurally identical can be guided laterally onto a wraparound means 3 via the connecting hooks 49 from the right in the illustration here. The insertion bevels 21 and 22, and the corresponding insertion bevels of the second sliding rail half, are then arranged in the region of the sliding faces 11 and 12, for example centrally.

Figure 4:
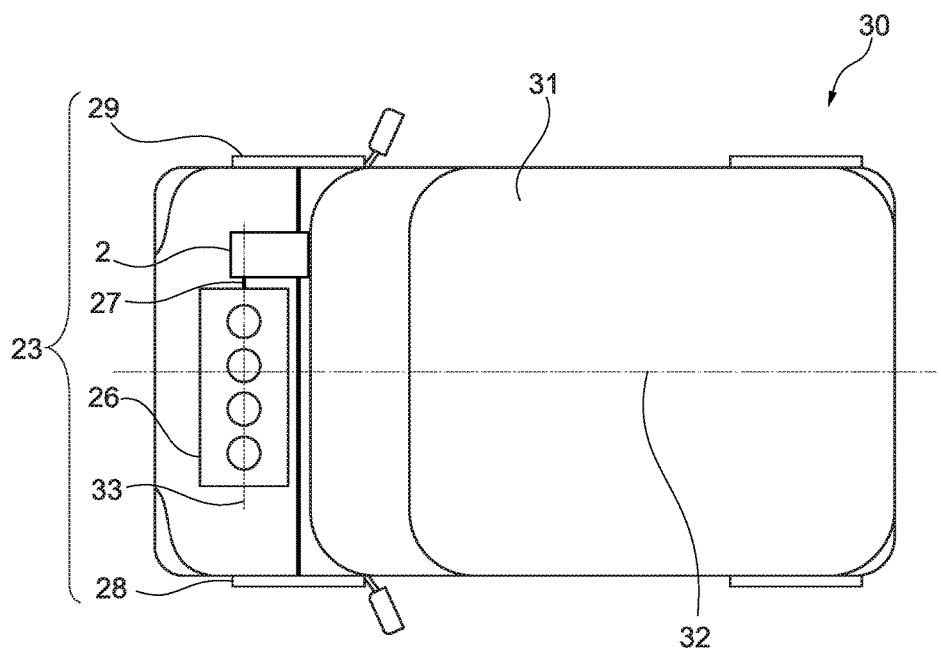
FIG. 4 shows a drive train in a motor vehicle with a friction clutch.

FIG. 4 diagrammatically shows a drive train 23, comprising a drive unit 26 (shown here as an internal combustion engine), an output shaft 27, a wraparound transmission 2 and a left-hand drive wheel 28 and right-hand drive wheel 29 which are connected in a torque-transmitting manner. Here, the drive train 23 is arranged in a motor vehicle 30, the drive unit 26 being arranged in front of the driver's cab 31 with its engine axis 33 transversely with respect to the longitudinal axis 32.

The sliding system which is proposed here achieves improved guidance in the operating state and therefore lower noise emissions.

LIST OF REFERENCE NUMBERS

1 Sliding system
2 Wraparound transmission
3 Wraparound means
4 Transmission input shaft
5 Transmission output shaft
6 First deflecting axis
7 Second deflecting axis
8 Height
9 Sliding rail
10 Sliding channel
11 Inner sliding face
12 Outer sliding face
13 Running direction
14 Entry section
15 Main section
16 Exit section
17 Setpoint height
18 First section height
19 Second section height
20 Third section height
21 First lateral insertion bevel
22 Second lateral insertion bevel
23 Drive train
24 First cone pulley pair
25 Second cone pulley pair
26 Drive unit
27 Output shaft
28 Left-hand drive wheel
29 Right-hand drive wheel
30 Motor vehicle
31 Driver's cab
32 Longitudinal axis
33 Engine axis
34 First inner entry point
35 First outer entry point
36 Second inner entry point
37 Second outer entry point
38 First inner main point
39 First outer main point
40 Second inner main point
41 Second outer main point
42 First inner exit point
43 First outer exit point
44 Second inner exit point
45 Second outer exit point
46 Sliding rail bearing
47 Bearing seat
48 Sliding rail half
49 Connecting hook

The invention claimed is:

1. A sliding system for a wraparound transmission, the sliding system comprising:
a wraparound element for connecting a transmission input shaft to a transmission output shaft in a torque-transmitting manner, the wraparound element having a plurality of deflecting axes and a height oriented transversely with respect to the deflecting axes; and,
a sliding rail having a sliding channel with an inner sliding face and an outer sliding face, wherein the sliding channel defines a running direction for the wraparound element, and the sliding channel being divided in the running direction into an entry section, a main section and an exit section, the sliding channel having a setpoint height adapted to the height of the wraparound element,
wherein only at room temperature of the inner and outer sliding faces, the main section has a first section height equal to the setpoint height, and, at a lower temperature of the inner and outer sliding faces the first section height is lower than the setpoint height.

2. The sliding system of claim 1, wherein the entry section has a second section height and/or the exit section has a third section height lower than the setpoint height, wherein the second section height and/or the third section height are equal to the setpoint height at an operating temperature of the inner and outer sliding faces.

3. The sliding system of claim 1, wherein the sliding channel has at least one lateral insertion bevel for the wraparound element, wherein after the room temperature of the inner and outer sliding faces is reached, the wraparound element is introduced into the sliding channel.

4. A wraparound transmission for a drive train, comprising:
at least one transmission input shaft with a first cone pulley pair;
at least one transmission output shaft with a second cone pulley pair; and
the sliding system according to claim 1, the wraparound element connecting the first cone pulley pair to the second cone pulley pair in a torque-transmitting manner, and the sliding rail being configured to reduce vibrations and undulations of the one wraparound element.

5. A drivetrain having a drive unit with an output shaft, at least one consumer and a wraparound transmission according to claim 4, wherein the output shaft is connected to the at least one consumer with a variable transmission ratio by the wraparound transmission for transmission of torque.

6. A motor vehicle having at least one drive wheel driven by the drive train according to claim 5.

7. The sliding system of claim 1, wherein the wraparound element is a transmission chain.

8. The sliding system of claim 1, wherein the room temperature is 20 degrees Celsius.

9. A sliding rail for a wraparound element of a wraparound transmission for reducing vibrations and undulations of the wraparound transmission, the sliding rail comprising:
a sliding channel with an inner sliding face and an opposing outer sliding face, wherein, the sliding channel defines a running direction for the wraparound element,
the wraparound element having, in the running direction, a plurality of deflecting axes oriented transversely with respect to the running direction and parallel to the inner and outer sliding faces, and the wraparound element having a height oriented transversely with respect to the deflecting axes, and wherein the sliding channel is divided in the running direction into an entry section, a main section and an exit section, the sliding channel having a setpoint height adapted to the height of the wraparound element, wherein an operating temperature of the inner and outer sliding faces, the main section has a first section height equal to the setpoint height, and, at a lower temperature of the inner and outer sliding faces, the first section height is lower than the setpoint height.

10. The sliding rail of claim 9, wherein the height of the wraparound element is defined by a spacing between an outer envelope and an inner envelope of the wraparound element.

11. The sliding rail of claim 9, wherein the entry section has a second section height lower than the setpoint height, and wherein the second section height expands to become equal to the setpoint height when an operating temperature of the inner and outer sliding faces is reached.

12. The sliding rail of claim 11, wherein the exit section has a third section height lower than the setpoint height, and wherein the third section height expands to become equal to the setpoint height when the operating temperature of the inner and outer sliding faces is reached.

13. The sliding rail of claim 9, wherein the running direction defined by the sliding channel limits deflection of the wraparound element about the deflecting axes.

14. The sliding rail of claim 9, further comprising a bearing on which the sliding rail is movably mounted by a bearing seat such that a position of the sliding channel of the sliding rail can be adjusted.

15. The sliding rail of claim 9, wherein the wraparound element is a transmission chain.

16. The sliding rail of claim 9, wherein the operating temperature is 80 degrees Celsius.

* * * * *